(12) United States Patent
Nakamichi

(10) Patent No.: US 8,841,996 B2
(45) Date of Patent: Sep. 23, 2014

(54) DRIVING ASSISTANCE DEVICE

(75) Inventor: Hideaki Nakamichi, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/980,367

(22) PCT Filed: Feb. 2, 2012

(86) PCT No.: PCT/JP2012/052363
§ 371 (c)(1),
(2), (4) Date: Jul. 18, 2013

(87) PCT Pub. No.: WO2012/132541
PCT Pub. Date: Oct. 4, 2012

(65) Prior Publication Data
US 2013/0293370 A1    Nov. 7, 2013

(30) Foreign Application Priority Data

Mar. 31, 2011  (JP) ................... 2011-077038

(51) Int. Cl.
| | |
|---|---|
| *B60Q 1/00* | (2006.01) |
| *B60K 35/00* | (2006.01) |
| *B60W 50/14* | (2012.01) |
| *B60W 40/09* | (2012.01) |
| *B60R 16/023* | (2006.01) |
| *G09B 29/00* | (2006.01) |

(52) U.S. Cl.
CPC ............ *B60R 16/0236* (2013.01); *G09B 29/00* (2013.01); *B60K 35/00* (2013.01); *B60W 50/14* (2013.01); *B60W 2540/30* (2013.01); *B60K 2350/1092* (2013.01); *B60W 40/09* (2013.01); *B60W 2050/146* (2013.01); *B60W 2540/00* (2013.01)
USPC .............................. 340/439; 340/428; 701/22

(58) Field of Classification Search
USPC .............. 340/439, 425.5, 428, 438, 441, 461; 345/60, 212; 701/1, 22
See application file for complete search history.

(56) References Cited

U.S. PATENT DOCUMENTS

| | | | |
|---|---|---|---|
| 8,063,755 B2 * | 11/2011 | Eikelenberg et al. | ......... 340/439 |
| 8,576,216 B2 * | 11/2013 | Correa et al. | ................ 345/212 |
| 2009/0157267 A1 | 6/2009 | Shin et al. | |
| 2010/0082228 A1 | 4/2010 | Lee | |

FOREIGN PATENT DOCUMENTS

| | | |
|---|---|---|
| DE | 10056756 | 5/2002 |
| JP | 2002-362185 | 12/2002 |
| JP | 2003-278573 | 10/2003 |
| JP | 2010-076740 | 4/2010 |
| JP | 2010-137611 | 6/2010 |

OTHER PUBLICATIONS

European Search Report issued on May 21, 2014 for corresponding European application No. 12765507.4.

* cited by examiner

*Primary Examiner* — Toan N Pham
(74) *Attorney, Agent, or Firm* — Rankin, Hill & Clark LLP

(57) ABSTRACT

A driving assistance device includes a display unit which displays an energy consumption rate map which shows a distribution of an energy consumption rate during travel of a vehicle, an icon which indicates a current energy consumption rate of the vehicle on the energy consumption rate map, the energy consumption rate being defined by a speed of the vehicle and an acceleration/deceleration of the vehicle, and a direction defining display portion which defines a moving direction of the icon, wherein the energy consumption rate map displays an eco region, which is a region in which the energy consumption rate is lower than a predetermined value, with a color different from those of the other regions of the energy consumption rate map in the display unit.

20 Claims, 15 Drawing Sheets

DRIVING ASSISTANCE DEVICE

TECHNICAL FIELD OF THE INVENTION

The present invention relates to a driving assistance device for causing a vehicle to travel with reduced fuel consumption and the like.

Priority is claimed on Japanese Patent Application No. 2011-077038, filed Mar. 31, 2011, the content of which is incorporated herein by reference.

BACKGROUND ART

Driving assistance devices which assist a driver in performing eco driving so as to cause a vehicle to travel with reduced fuel consumption are known. For example, there is disclosed a driving assistance device which allows eco driving when driving is performed using, for example, an eco speed guide needle and a vehicle speedometer to make the acceleration at the time of starting up the vehicle constant so as to match the vehicle speed with the eco speed guide needle (refer to Patent Document 1).

PRIOR ART DOCUMENTS

Patent Documents

Patent Document 1: Japanese Unexamined Patent Application, First Publication No. 2010-76740

SUMMARY OF THE INVENTION

Problems to be Solved by the Invention

However, in the prior art, only maintaining a constant acceleration at the time of starting up the vehicle is achieved, and there is a problem in that at a given point in time, the driver cannot quickly understand how they can perform eco driving in which energy consumption is reduced.

In addition, the above-described display performs just guidance to maintain the constant acceleration, and there is a problem in that it is impossible to sufficiently assist in low-energy-consumption driving.

An object of the invention is to provide a driving assistance device which can easily and reliably assist a driver with low-energy-consumption driving.

Means for Solving the Problems

The following are employed to achieve the object.

That is, (1) a driving assistance device according to an aspect of the invention includes a display unit which displays an energy consumption rate map which shows a distribution of an energy consumption rate which is an energy consumption per unit travel distance of a vehicle, an icon which indicates a current energy consumption rate (driving situation) of the vehicle on the energy consumption rate map, the energy consumption rate being defined by a speed of the vehicle and an acceleration/deceleration of the vehicle, and a direction defining display portion which defines a moving direction of the icon, wherein the energy consumption rate map displays an eco region, which is a region in which the energy consumption rate is lower than a predetermined value, with a color different from those of the other regions of the energy consumption rate map in the display unit.

(2) In the driving assistance device according to the above-described (1), the direction defining display portion may include a symbol, a figure, or a word which is displayed adjacent to the icon and defines a front-back direction of the icon.

(3) In the driving assistance device according to the above-described (1) or (2), the display unit may include an indicator which corresponds to the energy consumption rate map and indicates that the acceleration of the vehicle is near zero.

(4) In the aspect described in any one of the above-described (1) to (3), a configuration may be employed in which in the energy consumption rate map, the distribution of the energy consumption rate changes during travel of the vehicle on an upward slope or on a downward slope.

(5) In the aspect described in any one of the above-described (1) to (4), the energy consumption rate map may uses two axes composition representing a speed of the vehicle and an acceleration/deceleration of the vehicle.

(6) A driving assistance device according to another aspect of the invention includes a display unit which displays a one-dimensional energy consumption rate map which is obtained by cutting out, at a current speed or acceleration/deceleration of a vehicle, an energy consumption rate map which indicates a distribution of an energy consumption rate which is an energy consumption per unit travel distance of the vehicle, and an icon which indicates a current energy consumption rate (driving situation) of the vehicle, which is defined by a speed of the vehicle and an acceleration/deceleration of the vehicle, on the one-dimensional energy consumption rate map, wherein the icon is formed into a non-line-symmetric shape to indicate a moving direction of the vehicle, which is obtained based on a speed of the vehicle and an acceleration/deceleration of the vehicle, and the one-dimensional energy consumption rate map displays an eco region, which is a region in which the energy consumption rate is lower than a predetermined value, with a color different from those of the other regions of the one-dimensional energy consumption rate map in the display unit.

(7) In the driving assistance device according to the above-described (6), a size or a position of the eco region may be determined in accordance with a speed of the vehicle or an acceleration/deceleration of the vehicle.

(8) In the driving assistance device according to the above-described (6) or (7), a configuration may be employed in which the size of the eco region is maximized when the icon is positioned near a central part of the eco region.

(9) In the aspect described in any one of the above-described (6) to (8), a smaller a range in which the eco region and the icon overlap each other, a smaller eco region may be displayed.

(10) In the aspect described in any one of the above-described (6) to (9), the display unit may include an indicator which corresponds to the one-dimensional energy consumption rate map and indicates that the acceleration of the vehicle is near zero.

(11) In the aspect described in any one of the above-described (6) to (10), a configuration may be employed in which in the one-dimensional energy consumption rate map, the distribution of the energy consumption rate changes during travel of the vehicle on an upward slope or on a downward slope.

(12) In the aspect described in any one of the above-described (6) to (11), the one-dimensional energy consumption rate map may use one axis composition representing the acceleration/deceleration of the vehicle.

Effect of the Invention

According to the driving assistance device of the above-described aspect (1) of the invention, by displaying an icon indicating the current energy consumption rate (driving situation) of a vehicle on a map showing an energy consumption rate, and by changing the speed of the vehicle and the acceleration/deceleration of the vehicle in accordance with the direction defining display portion of the display unit, the icon on the map showing the energy consumption rate can be moved to a region in which the energy consumption rate is low. Thus, an occupant can rapidly grasp how the occupant should perform speed control to perform eco driving in which the energy consumption rate is low, and thus can easily and reliably perform eco driving.

In addition, eco driving can be conducted with a simple operation of moving the icon to the region in which the energy consumption rate is low. Furthermore, since the energy consumption rate is used, it is possible to reliably inform the driver of the region of the map in which the energy consumption rate is low in accordance with the speed or acceleration/deceleration.

According to the driving assistance device of the above-described aspect (2) of the invention, when moving the icon, a front-back direction of the icon can be rapidly understood by using, as an indicator, a symbol, a figure, or a word of the direction defining display portion which is disposed adjacent to the icon. Thus, it is possible to rapidly understand which direction the icon should be moved to perform eco driving.

According to the driving assistance device of the above-described aspect (3) of the invention, by bringing the icon closer to the indicator, it is possible to grasp the fact that the driving is being performed at a constant speed, and a further eco driving becomes possible.

According to the driving assistance device of the above-described aspect (4) of the invention, eco driving can be reliably assisted by changing the distribution in response to a changing state of the energy consumption rate during travel on an upward slope or on a downward slope.

According to the driving assistance device of the above-described aspect (5) of the invention, since the icon can be moved to the eco region by changing the speed and the acceleration/deceleration through an accelerator and brake operation of the driver, eco driving can be easily realized.

According to the driving assistance device of the above-described aspect (6) of the invention, by displaying an icon indicating a current energy consumption rate (driving situation) of a vehicle on a one-dimensional energy consumption rate map, and by changing a speed of the vehicle and an acceleration/deceleration of the vehicle based on a non-line-symmetric shape of the icon itself which indicates a moving direction, the icon indicating a current energy consumption rate can be moved to an eco region in which the energy consumption rate is low. Thus, an occupant can rapidly grasp how the occupant should perform speed control to perform eco driving in which the energy consumption rate is low, and thus can easily and reliably perform eco driving.

In addition, eco driving can be conducted with a simple operation of moving the icon to the eco region in which the energy consumption rate is low. Furthermore, since the energy consumption rate is used, it is possible to securely inform the driver of the eco region in which the energy consumption rate is low in accordance with the speed or acceleration/deceleration.

Particularly, since the icon itself is formed into a non-line-symmetric shape to indicate the moving direction, it is not necessary for the display unit to display other various display items.

According to the driving assistance device of the above-described aspect (7) of the invention, depending on the current speed or acceleration/deceleration of the vehicle, a position, which relates to the current speed or the acceleration/deceleration in the energy consumption rate map, where the one-dimensional energy consumption rate map is cut out from the energy consumption rate map varies. Thus, the size or the position of the eco region, which indicates where the energy consumption rate is low, changes. Therefore, eco driving can be easily conducted by moving the icon in accordance with a change of the size or the position of the eco region.

According to the driving assistance device of the above-described aspect (8) of the invention, depending on the current speed or acceleration/deceleration of the vehicle, a position, which relates to the current speed or the acceleration/deceleration in the energy consumption rate map, where the one-dimensional energy consumption rate map is cut out from the energy consumption rate map varies. Thus, the size or the position of the eco region, which indicates where the energy consumption rate is low, changes. Therefore, the eco region is displayed in a maximum size when driving is performed so that the icon is positioned in a central part of the eco region. Accordingly, the moving range of the icon increases and the degree of freedom of the driver's driving motion can be increased in accordance with this increase.

According to the driving assistance device of the above-described aspect (9) of the invention, depending on the current speed or acceleration/deceleration of the vehicle, a position, which relates to the current speed or the acceleration/deceleration in the energy consumption rate map, where the one-dimensional energy consumption rate map is cut out from the energy consumption rate map varies. Thus, the size or the position of the eco region, which indicates where the energy consumption rate is low, changes. Therefore, when a range in which the eco region and the icon overlap each other is small, a smaller eco region is displayed. Therefore, this reduced eco region strongly prompts the driver to move the icon into the eco region, and thereby it is able to assist conducting the eco driving.

According to the driving assistance device of the above-described aspect (10) of the invention, by bringing the icon closer to the indicator, it is possible to grasp the fact that the driving is being performed at a constant speed, and a further eco driving becomes possible.

According to the driving assistance device of the above-described aspect (11) of the invention, eco driving can be reliably assisted by changing the distribution in response to a changing state of the energy consumption rate during travel on an upward slope or on a downward slope.

According to the driving assistance device of the above-described aspect (12) of the invention, since the icon can be moved to the eco region by changing the speed and the acceleration/deceleration through an accelerator and brake operation of the driver, eco driving can be simply realized.

DESCRIPTION OF EMBODIMENTS

Figure 1:
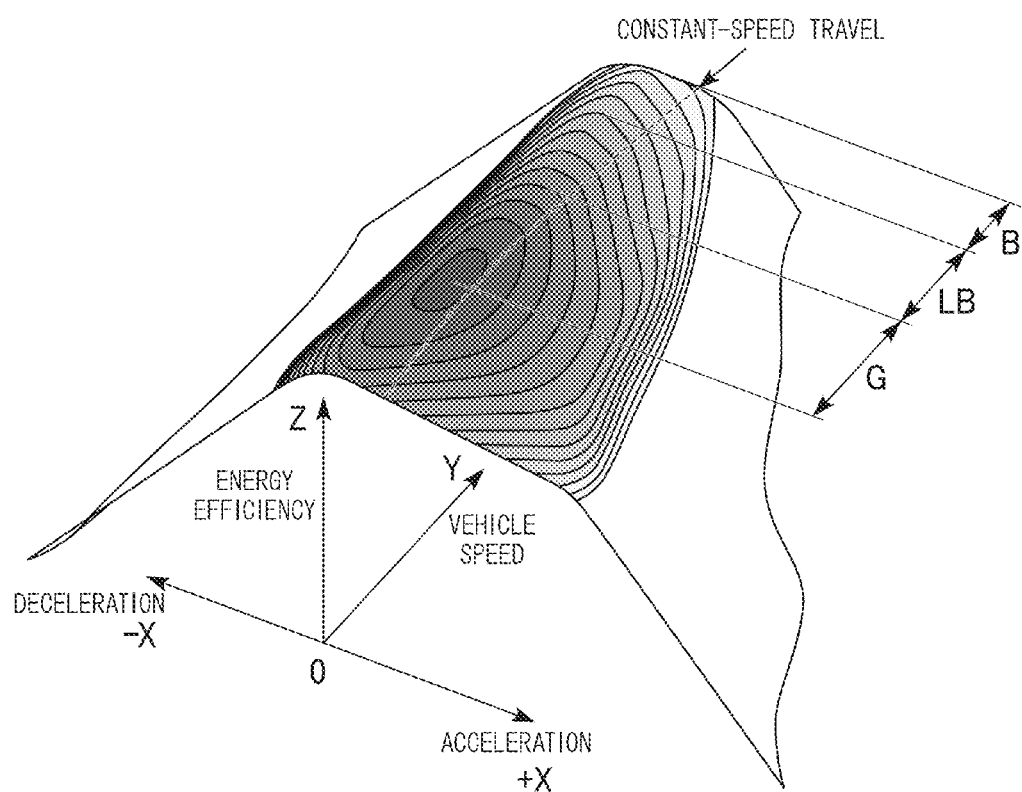
FIG. 1 is a diagram showing a three-dimensional energy consumption rate map of a vehicle.

Next, embodiments of the invention will be described based on the drawings.

Generally, when a vehicle having, as well as an engine, a motor for travelling drive travels, the value of the total energy loss directly linked to the fuel consumption is a sum of an engine loss, a machine transfer loss, an electricity and auxiliary machine loss, a travelling transfer loss, and a brake heat loss, when viewing the energy loss in consideration of the consumption place.

When viewing the energy loss in consideration of what is consumed, the value of the total energy loss is a sum of kinetic energy consumption, potential energy consumption, electric energy consumption, and combustion energy of the vehicle. The kinetic energy is accumulated by acceleration, and consumed by deceleration. The potential energy is accumulated by travel on an upward slope, and consumed by travel on a downward slope. The electric energy is accumulated by charging, and consumed by discharge. The combustion energy is consumed by fuel injection.

Here, what is consumed can be calculated during the travel of the vehicle using an existing sensor. Therefore, using this, it is possible to assist the driver to realize low-fuel-consumption travel.

The energy consumption per unit travel distance is defined as "energy consumption rate (kJ/m)", and by using an indicator which is called the energy consumption rate, the efficiency is evaluated in all of the driving situations. Here, "kJ" represents kilojoules, and "m" represents meters.

During the travel of the vehicle, the following Expression (1) is established.

$$\text{Energy Consumption Rate}(kJ/m) = (Ef + Eb + Ei + Ep)/d \quad (1)$$

Since the travel distance is zero when the vehicle has stopped, the energy consumption per unit travel time is defined and calculated as "energy consumption rate (kJ/min)". Here, "min" represents minutes.

In Expression (1), "Ef" represents combustion energy. The combustion energy "Ef" is expressed as a product of a fuel injection amount (cc) represented by cf, a thermal value of fuel (35 kJ/cc) represented by e, and maximum engine thermal efficiency ($\cong 0.33$) represented by η. The fuel injection amount is obtained by sensing the fuel injection time and the flow rate.

"Eb" represents electric energy. The electric energy "Eb" is expressed as P·t/0.278 (P: electricity (W), t: elapsed time (h)). The electric energy "Eb" is obtained by integrating sensed current values of the battery.

"Ei" represents kinetic energy. The kinetic energy "Ei" is expressed as ½·m·($v_1^2 - v_0^2$) (m: mass (kg), v: vehicle speed (m/s)). The kinetic energy "Ei" is obtained based on a sensed vehicle speed.

"Ep" represents potential energy. The potential energy "Ep" is expressed as m·g·Δh (Δh=Rslope (gradient estimate value sin θ)·d (travel distance)). The potential energy "Ep" is obtained by sensing a gradient. "Ef", "Eb", "Ei", and "Ep" have a concept of including a reference sign. In addition, "d" represents a travel distance, "min" represents minutes, and "g" represents gravitational acceleration.

The electric energy "Eb" represents electric energy of charging (+) during decelerating regeneration or discharge (−) during accelerating assistance, of a high-voltage battery as a drive source of a motor for travelling drive which is used for a hybrid vehicle or an electric vehicle. Accordingly, in the case of an engine-travelling vehicle other than a hybrid vehicle and an electric vehicle, the electric energy is zero.

In this manner, the energy consumption per unit travel distance or per unit travel time is converted into an energy consumption rate, and thus uniform evaluation is possible regardless of speed.

FIG. 1 shows a three-dimensional energy consumption rate map of a vehicle in which an X-axis represents an acceleration/deceleration of the vehicle, a Y-axis represents a speed of the vehicle, and a Z-axis represents the reciprocal of an energy consumption rate (energy efficiency). An annular line which is shown in the three-dimensional energy consumption rate map and vertically long in the Y-axis direction represents a part in which the energy consumption rate is the same, and shows a situation in which the higher the value of the Z-axis, the lower the energy consumption rate and the better the fuel consumption. The broken line shown in FIG. 1 represents a position of constant-speed travel at which the acceleration/deceleration is zero. The three-dimensional energy consumption rate map is a characteristic set for each vehicle and stored in a memory region in advance, so that the map data in the memory region is read out by a corresponding engine control unit (ECU) and output to a display unit to be described later.

In FIG. 1, in the central part in FIG. 1, a region around a part in which the energy consumption rate is low is set to an eco region, and this eco region is represented by a green region G. In addition, a light-blue region LB having a different color is on the outside of the green region G, and a blue region B having a more different color is on the outside of the light-blue region LB. Although the reference symbol G representing the green region, the reference symbol LB representing the light-blue region, and the reference symbol B representing the blue region are shown only in the +Y-axis direction from the central point of the green region G, the respective regions show a gradual continuous variation in color in a radial manner around the central point of the green region G. This expresses that the energy consumption rate is minimum in the green region G, and the farther outside the green region G, the higher the energy consumption rate, and thus the fuel consumption and the like deteriorate.

Here, the reason for the three-dimensional energy consumption rate map of FIG. 1 to be shown by the three axes of the reciprocal of the energy consumption rate, the vehicle speed, and the acceleration/deceleration is as follows.

This is because when a driver operates an accelerator pedal and a brake pedal so that the vehicle speed and the acceleration/deceleration are changed, the energy consumption rate which is determined by the combustion energy, the electric energy, and the kinetic energy in Expression (1) changes. Here, regarding the potential energy, the distribution changes during travel on an upward slope or on a downward slope so that the three-dimensional energy consumption rate map shifts to the deceleration side or the acceleration side, and thus the value of the energy consumption rate corresponding to the speed and the acceleration/deceleration is different from the value in the case of flat land.

Figure 2:
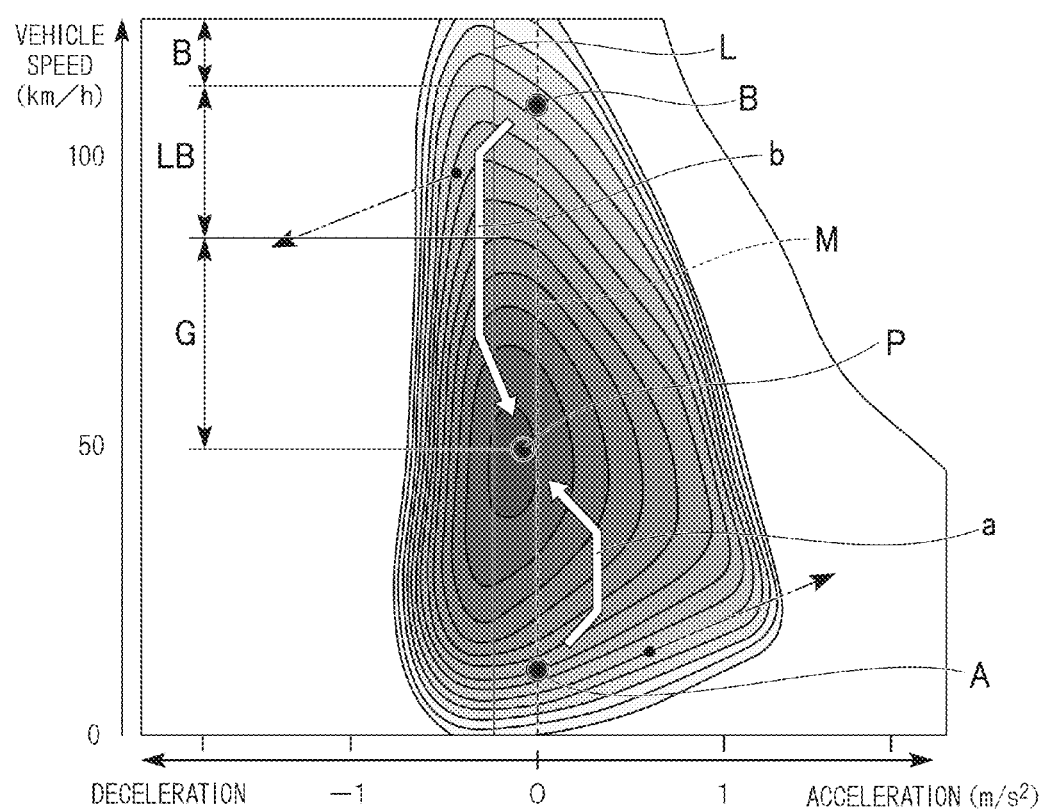
FIG. 2 is a diagram showing an energy consumption rate map of the vehicle.

FIG. 2 is a two-dimensional energy consumption rate map obtained by viewing the three-dimensional energy consumption rate map of FIG. 1 from the Z-axis direction. That is, FIG. 2 is a two-dimensional energy consumption rate map obtained by reconfiguring the three-dimensional energy consumption rate map into two axes of the vehicle speed and the acceleration/deceleration. In FIG. 2, the vertical axis represents the vehicle speed, and the horizontal axis represents the acceleration/deceleration. In FIG. 1, the Z-axis represents the reciprocal of the energy consumption rate. However, in the two-dimensional energy consumption rate map, in the central part, a region surrounded by an annular line which is vertically long in the Y-axis direction represents a range in which the energy consumption rate is minimum, and means that the farther outside the above region, the higher the energy consumption rate. The vertical line L represents a value of the acceleration/deceleration at which the energy consumption rate is minimized at each vehicle speed. The broken line M represents a position of constant-speed travel at which the acceleration/deceleration is zero.

As in the case of FIG. 1, in the central part in FIG. 2, a region around a part in which the energy consumption rate is low is set to an eco region, and this eco region is represented by a green region G. In addition, a light-blue region LB having a different color is on the outside of the green region G, and a blue region B having a more different color is on the outside of the light-blue region LB. Although the reference symbol G representing the green region, the reference symbol LB representing the light-blue region, and the reference symbol B representing the blue region are shown only in the +vertical-axis direction from the central point of the green region G, the respective regions show a gradual continuous variation in color in a radial manner around the central point of the green region G. This expresses that the energy consumption rate is minimum in the green region G, and the farther outside the green region G, the higher the energy consumption rate, and thus the fuel consumption and the like deteriorate. FIGS. 9, 11, 13, 15, and 17 to be described later also express the range of the eco region in the same manner.

In FIG. 2, for example, when the vehicle speed is in the range of 30 km/h to 60 km/h and the acceleration/deceleration is in the range of −0.4 m/sec$^2$ to 1.0 m/sec$^2$, the eco region in which the energy consumption rate is lower than a predetermined value (for example, 0.5 kJ/m) can be reached.

In FIG. 2, the points A and B represent a current travel state of the vehicle. In the case of the vehicle having such energy consumption rate characteristics, for example, when an icon is positioned at the point A (insufficient speed), the speed is increased with an appropriate acceleration as shown by the arrow a to reach the eco region which is a part (green region G) in which the fuel consumption rate is low in the central part in an appropriate acceleration/deceleration range. Then, the acceleration is maintained, and then the increased speed is relaxed, whereby it is possible to transit to the eco region. In addition, when a current travel state of the vehicle is positioned at the point B (excessive speed), the speed is reduced with an appropriate deceleration as shown by the arrow b to reach the eco region. Then, the deceleration is maintained, and then the reduction of the speed is relaxed, whereby it is possible to transit to the eco region. In FIG. 2, the eco region represents a region inside the second annular line from the center. In FIG. 2, the target point P of the eco region is in the eco region and is a position of constant-speed travel on the broken line M.

Here, a light-blue region LB having a different color is on the outside of the green region G which is an eco region, and a blue region B having a more different color is on the outside of the light-blue region LB. The respective regions show a gradual continuous variation in color. The energy consumption rate is minimum in the green region G, and the farther outside the green region G, the higher the energy consumption rate, and thus the fuel consumption and the like deteriorate. In FIG. 2, when the vehicle travels to deviate from the position of the point A or B to a position on the outside of the blue as shown by the chain line arrow, the energy consumption rate rapidly increases, and thus the fuel consumption and the like rapidly deteriorate.

That is, when the energy consumption rate map of FIG. 2 and a current driving situation (positioning) on the energy consumption rate map, such as the point A or the point B, are known, it is possible to intuitively and easily understand the magnitude of a current energy consumption rate and how the energy consumption rate can be further reduced to reach the region in which the fuel consumption and the like are good. In the "fuel consumption and the like", the expression "and the like" is used in consideration of the fact that a hybrid vehicle or an electric vehicle which travels using a battery as a drive source is included.

Figure 3:
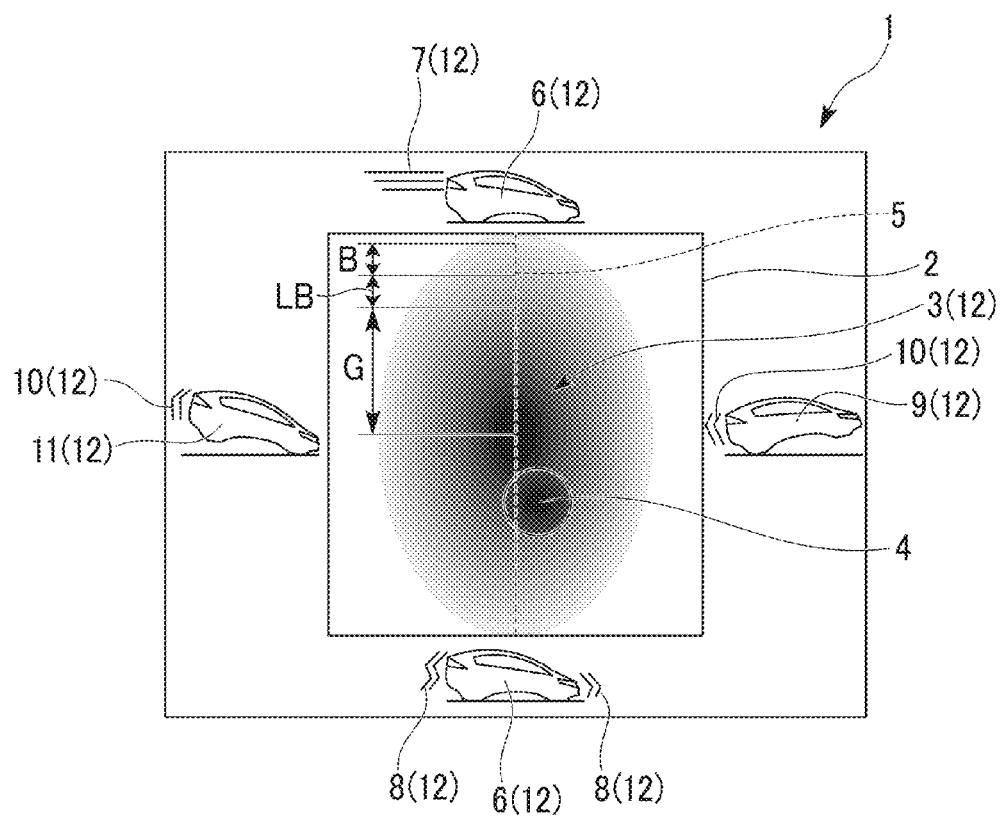
FIG. 3 is a diagram showing a display unit of a first embodiment of the invention.

FIG. 3 shows a display unit 1 installed in the vehicle. The display unit 1 can be applied in various forms such as a head-up display, a display of a car navigation system, and a multi-information display provided in a meter panel.

In FIG. 3, in a quadrilateral frame 2, an energy consumption rate map 3 showing the distribution of the energy consumption rate shown in FIG. 2 is disposed in such a state so as to have a form simplified into an elliptical shape which is vertically long in the vertical direction of the frame 2. In FIG. 3, the annular lines in FIG. 2 are omitted and only the gradual variation in color is shown through a change of intensity. In FIG. 3, the eco region is also represented by a green region G. In addition, a light-blue region LB having a different color is on the outside of the green region G, and a blue region B having a more different color is on the outside of the light-blue region LB. Although the reference symbol G representing the green region, the reference symbol LB representing the light-blue region, and the reference symbol B representing the blue region are only shown from the central point of the green region G to the upper side of the frame 2 (or the lower side of the frame 2), the respective regions show a gradual continuous variation in color in a radial manner around the central point of the green region G. This expresses that the energy consumption rate is minimum in the green region G, and the farther outside the green region G, the higher the energy consumption rate, and thus the fuel consumption and the like deteriorate. FIGS. 4 to 7 to be described later also express in the same manner.

A black icon 4 indicating a current vehicle energy consumption rate (driving situation) which is calculated based on a speed of the vehicle and an acceleration/deceleration of the vehicle is displayed as a circle on the energy consumption rate map 3. Here, the icon 4 is actually displayed so that the center thereof is white and gradually blends into the surrounding area. In the central part of the frame 2 in the horizontal direction, a line 5 representing constant-speed travel in which the speed does not increase or decrease is displayed by a broken line. A current energy consumption rate (driving situation) of the vehicle which is determined by a current speed and acceleration/deceleration of the vehicle is output as the icon 4 on the energy consumption rate map 3 which is displayed on the display unit 1 by the ECU.

Figure 6:
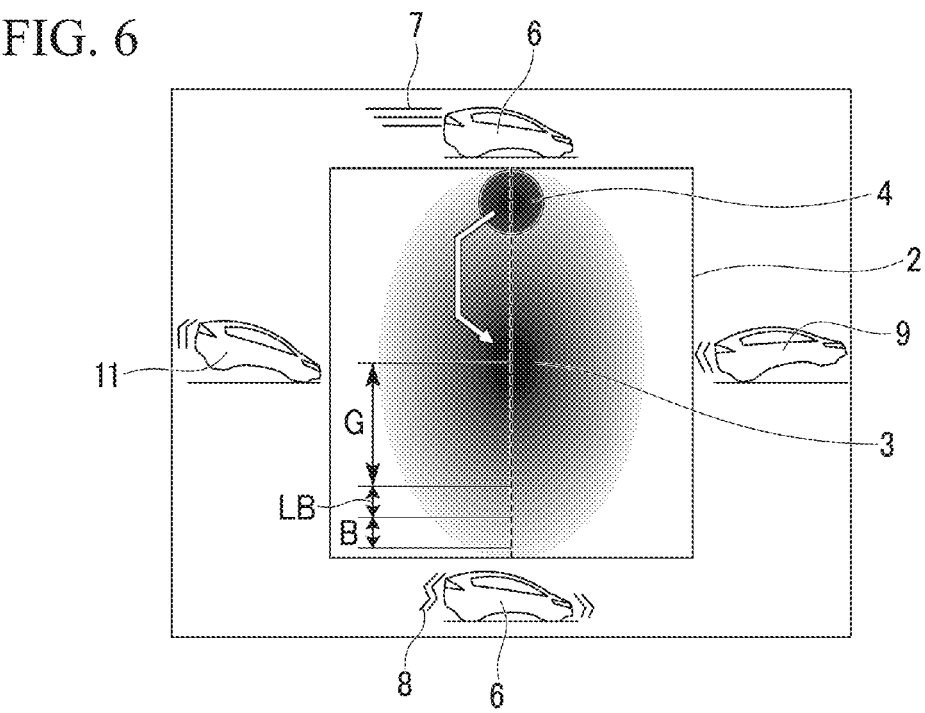
FIG. 6 is a diagram showing a display mode of the embodiment.
Figure 7:
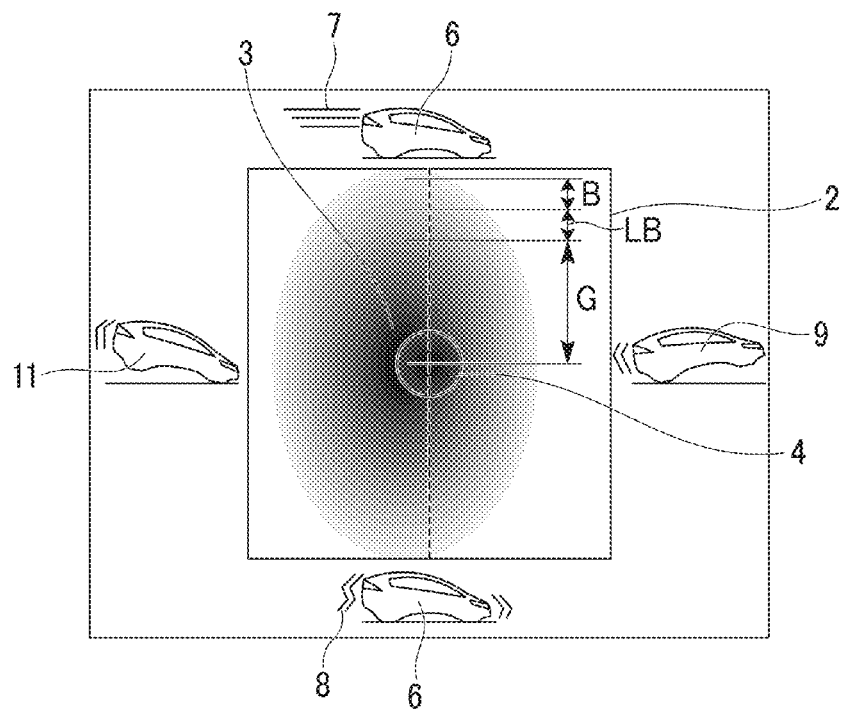
FIG. 7 is a diagram showing a display mode of the embodiment.

A vehicle FIG. 6, the moving direction of which is the right direction, which is directed to the front is provided above the upper side of the frame 2 adjacent to the icon 4, together with a rear streamline FIG. 7 representing a high speed. A vehicle FIG. 6, the moving direction of which is the right direction, which is directed to the front is provided below the lower side of the frame 2 adjacent to the icon 4, together with a forward-and-backward wavy line FIG. 8 representing a low speed.

Figure 9:
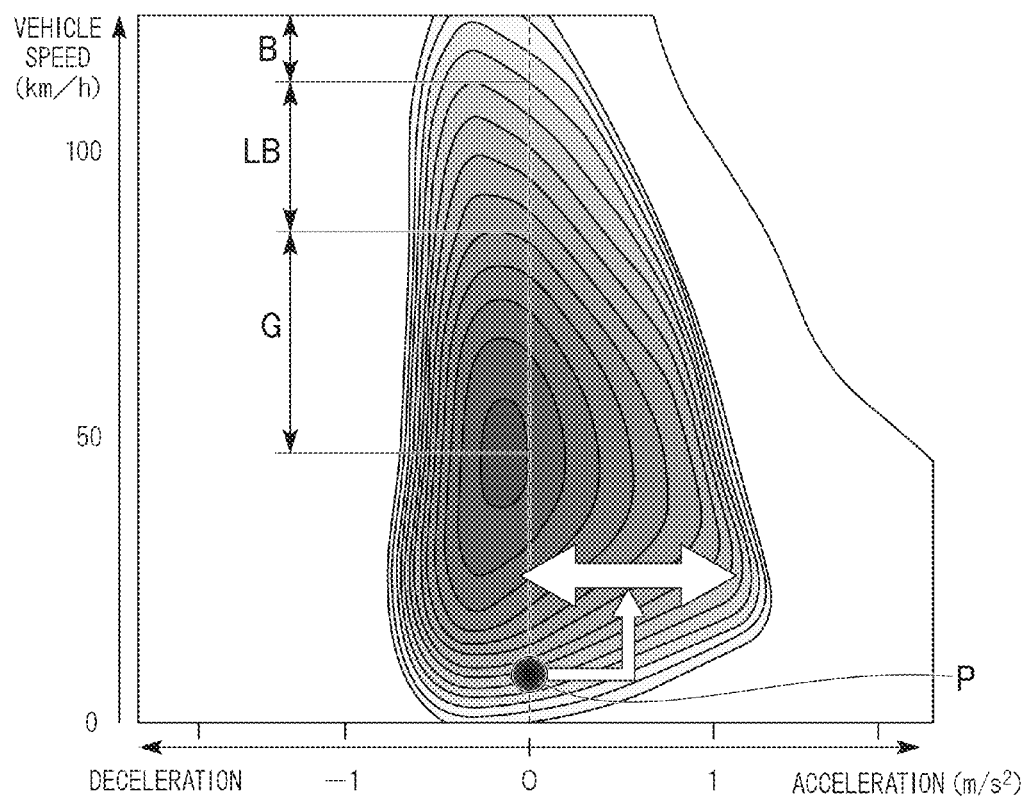
FIG. 9 is a diagram showing a range of the eco region in the energy consumption rate map of FIG. 2.
Figure 10:
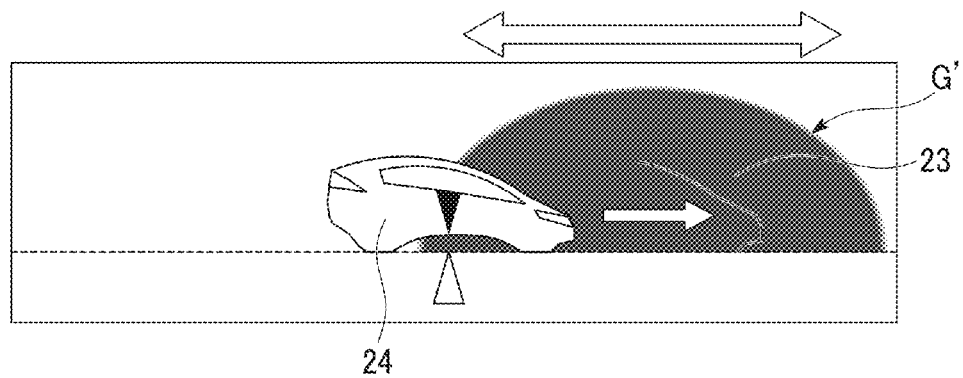
FIG. 10 is a diagram showing a display mode of the embodiment.

An acceleration vehicle FIG. 9, the moving direction of which is the right direction, which is directed to the front and in which its front side is raised representing an acceleration is provided on the right side of the right side of the frame 2 adjacent to the icon 4, together with a rearward wavy line FIG. 10. A deceleration vehicle FIG. 11, the moving direction of which is the right direction, which is directed to the front and in which its rear side is raised representing a deceleration is provided on the left side of the frame 2 adjacent to the icon 4, together with a rearward wavy line FIG. 10.

Figure 8:
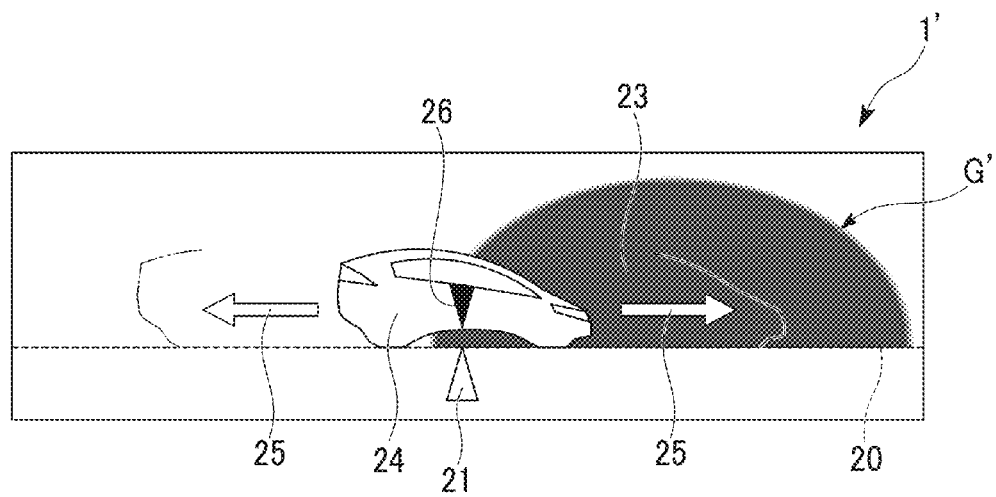
FIG. 8 is a diagram showing a display unit of a second embodiment of the invention.
Figure 11:
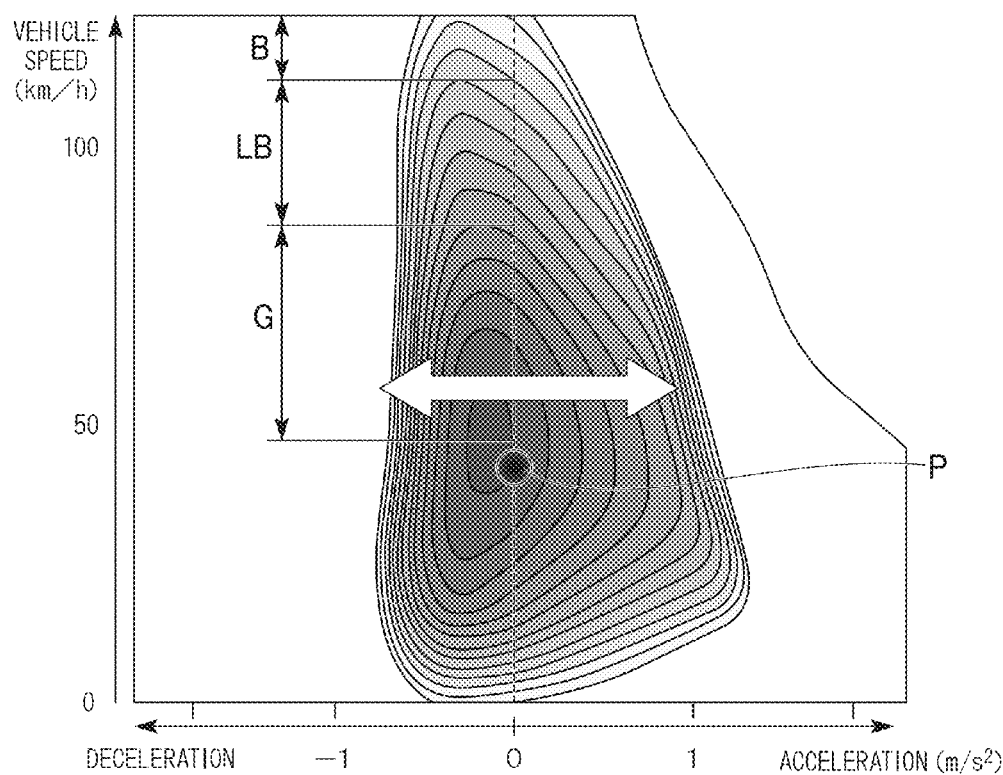
FIG. 11 is a diagram showing a range of the eco region in the energy consumption rate map of FIG. 2.

The vehicle FIG. 6, the streamline FIG. 7, the forward-and-backward wavy line FIG. 8, the acceleration vehicle FIG. 9, the rearward wavy line FIG. 10, and the deceleration vehicle FIG. 11, which are displayed around the frame 2, configure a direction defining display portion 12 which defines the moving direction of the icon 4. Other than the figures, words, symbols, or combinations thereof can be used for the direction defining display portion 12.

Figure 4:
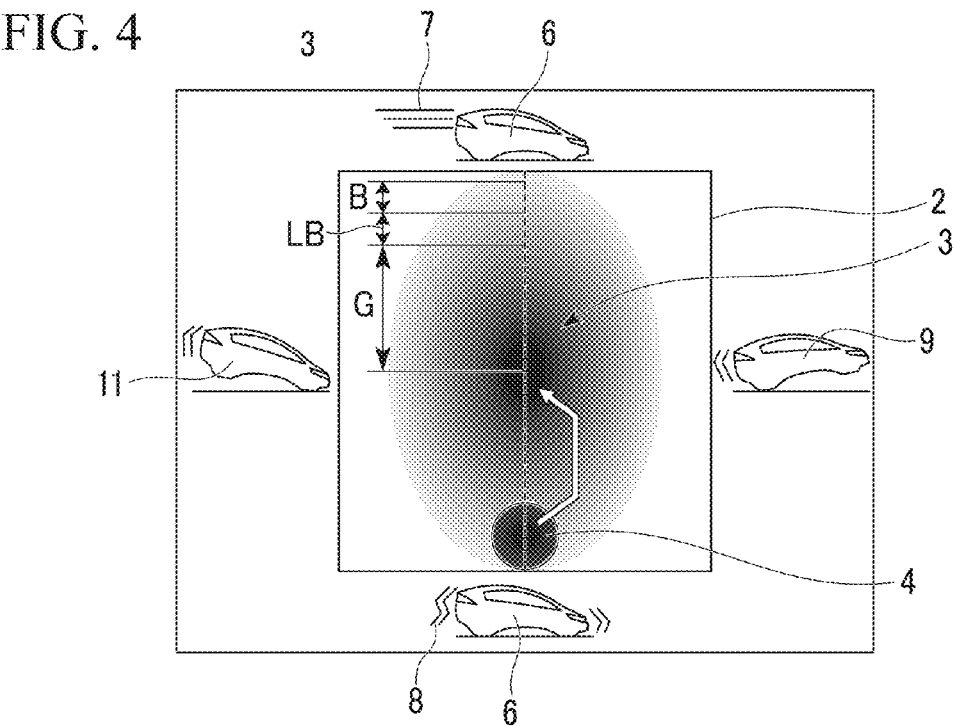
FIG. 4 is a diagram showing the display unit of the embodiment.
Figure 5:
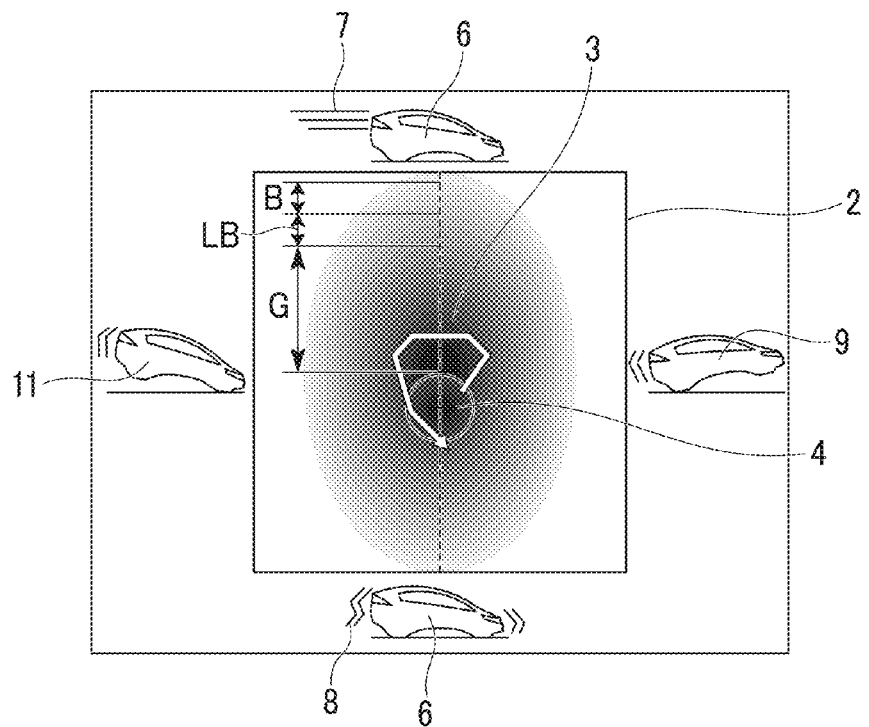
FIG. 5 is a diagram showing a display mode of the embodiment.

As shown in FIG. 4, first, when the vehicle is stopped and when the vehicle travels at a very low speed, the eco region which is a green region G can be reached as shown by the arrow by increasing the vehicle speed (moving upward). In addition, as shown in FIG. 5, by controlling the speed as shown by the arrow without departing from the eco region, the low energy consumption rate is maintained and no deviation from the eco region is thus possible.

In addition, as shown in FIG. 6, when the speed is too high, the eco region which is a green region G can be reached as shown by the arrow by reducing the vehicle speed (moving downward).

As shown in FIG. 7, since the energy consumption rate map 3 shifts to the deceleration side during travel on an upward slope, the acceleration side of the eco region which is a green region G is narrowed, and thus it is possible to visually understand the fact that a deviation from the green eco region occurs with a slight increase of the speed. On the other hand, although not shown in the drawing, since the energy consumption rate map 3 shifts to the acceleration side during travel on a downward slope, the deceleration side of the eco region which is a green region G is narrowed, and thus it is possible to visually understand the fact that a deviation from the green eco region occurs with a slight reduction of speed.

Accordingly, according to the embodiment, by displaying the icon 4 indicating a current vehicle energy consumption rate (driving situation) on the energy consumption rate map 3, and by changing the speed of the vehicle and the acceleration/deceleration of the vehicle in accordance with the direction defining display portion 12 of the display unit 1, the icon 4 on the energy consumption rate map 3 can be moved to the eco region which is a region in which the energy consumption rate is low. Thus, an occupant can rapidly grasp how the occupant should perform speed control to perform eco driving (driving at a reduced energy consumption rate) in which the energy consumption rate is low, and thus can easily and reliably perform eco driving.

Here, when the icon 4 is brought closer to the line 5, it is possible to grasp the fact that the driving is being performed at a constant speed, and a further eco driving becomes possible.

In addition, the eco driving can be conducted with a simple operation of moving the icon 4 to the eco region. Furthermore, since the energy consumption rate is used, it is possible to reliably inform the driver of the region in which the energy consumption rate is low in accordance with the speed or acceleration/deceleration.

In addition, when moving the icon 4, it is possible to rapidly understand the front-back direction of the icon 4 with the vehicle FIG. 6, the streamline FIG. 7, the forward-and-backward wavy line FIG. 8, the acceleration vehicle FIG. 9, the rearward wavy line FIG. 10, and the deceleration vehicle FIG. 11 as indicators, which configure the direction defining display portion 12 disposed outside the frame 2 adjacent to the icon 4. Accordingly, it is possible to rapidly understand which direction the icon 4 should be moved to perform eco driving.

The distribution of the energy consumption rate map 3 of the vehicle changes during travel of the vehicle on an upward or downward slope. That is, during travel on an upward slope, the acceleration side of the eco region is narrowed, and thus it is possible to visually understand the fact that a deviation from the eco region occurs with a slight increase of speed. On the other hand, during travel on a downward slope, the deceleration side of the eco region is narrowed, and thus it is possible to visually understand the fact that a deviation from the eco region occurs by a slight reduction in speed. Accordingly, eco driving can be reliably assisted.

Furthermore, since the energy consumption rate map 3 uses two axes composition representing the speed of the vehicle and the acceleration/deceleration of the vehicle, the icon 4 can be moved to the eco region by changing the speed and the acceleration/deceleration through an accelerator and brake operation of the driver, and it is possible to easily perform eco drive.

Next, a second embodiment of the invention will be described based on FIGS. 8 to 19 referring to FIGS. 1 and 2.

Unlike the first embodiment, a display unit 1' smaller than the display unit 1 of the first embodiment is used in this embodiment.

As shown in FIG. 8, the display unit 1' includes a lower line 20 (shown by the broken line) on the lower side thereof, and further includes, on the lower side of the central part of the lower line 20, a triangle mark 21 (indicator) with a triangular shape (having an apex facing upward) which corresponds to a one-dimensional energy consumption rate map 23 to be described later and indicates that an acceleration of a vehicle is near zero (constant-speed travel state). The display unit 1' displays the one-dimensional energy consumption rate map 23 in which a distribution of an energy consumption rate which is an energy consumption per unit of travel distance of the vehicle is indicated by a single color, and an icon 24 indicating, on the one-dimensional energy consumption rate map 23, a current energy consumption rate of the vehicle (driving situation) based on the speed of the vehicle and the acceleration/deceleration of the vehicle. Regarding this one-dimensional energy consumption rate map 23, the green region G and the light-blue region LB in the energy consumption rate map of FIG. 2 are collectively set to an eco region which is indicated by green G'. FIGS. 10, 12, 14, 16, and 18 to 21 to be described later also express the display mode in the same manner.

The one-dimensional energy consumption rate map 23 displays the energy consumption rate map shown in FIG. 2 cut out at a current vehicle speed. The eco region as an acceptable acceleration/deceleration range in which the energy consumption rate is low is indicated by green with an upper side bent in an arc in the acceleration/deceleration range. The one-dimensional energy consumption rate map 23 is a single-axis map having an acceleration/deceleration axis as a horizontal direction without displaying a vehicle speed axis. The right side of the display unit 1' in the horizontal direction represents the acceleration, and the left side represents the deceleration. The position of the triangle mark 21 is a position of constant-speed travel at which the acceleration is zero.

The icon 24 displays the energy consumption rate of the vehicle based on a current speed and acceleration/deceleration of the vehicle on the one-dimensional energy consumption rate map 23. The icon 24 is formed into a vehicle shape with a non-line-symmetric shape to indicate a moving direction which is obtained based on the speed of the vehicle and the acceleration/deceleration of the vehicle. Accordingly, the front and the rear of the vehicle can be recognized by the icon 24 itself, and it is possible to easily recognize that the right side is the front side as shown in FIG. 8.

Rightward and leftward arrow symbols 25, 25 which show whether the vehicle should be moved to the acceleration side or the deceleration side to reach the eco region are selectively displayed before and behind the icon 24. In FIG. 8, both of the arrow symbols 25, 25 are shown for convenience of description.

In the icon 24, an inverted triangle mark 26 having an apex facing downward is provided corresponding to the triangle mark 21. By combining the inverted triangle mark 26 with the triangle mark 21, the icon 24 is easily matched with the constant-speed travel position.

Accordingly, when the icon 24 is on the right side of the triangle mark 21, it indicates an acceleration state, and when the icon 24 is on the left side of the triangle mark 21, it indicates a deceleration state. In addition, the magnitude of the acceleration/deceleration of the vehicle is proportional to the moved amount of the icon 24.

The size or the position of the eco region is determined in accordance with the speed of the vehicle. That is, the reason for this is that the position at which the energy consumption rate map shown in FIG. 2 is cut out varies for every time when the speed of the vehicle is changed. When the vehicle is driven in the eco region, a display area of the eco region is displayed larger than in the case in which the vehicle travels away from the eco region.

That is, the energy consumption rate shown by the energy consumption rate map of FIG. 2 is expressed by a map of two axes of the speed and the acceleration/deceleration, and thus when this energy consumption rate map is cut out at a position of a current speed, the size of the eco region in the acceleration/deceleration direction varies in response to the speed, and a position with respect to the icon 24 at the current moment changes. Accordingly, when the icon 24 is positioned adjacent to the central part of the eco region, the eco region has the maximum size. In addition, when a range in which the eco region and the icon 24 overlap each other is small, the smaller the eco region is displayed.

Thus, as shown in FIGS. 9 and 10, when the vehicle is stopped and when the vehicle travels at a very low speed, an icon 24 partially entering an eco region and the eco region positioned on the acceleration side of the icon 24 are displayed. Therefore, when accelerating a vehicle having an energy consumption rate state represented by the point P with an appropriate acceleration so as to match the icon 24 with the eco region positioned on the front side, it is possible to reach a range on the front side, shown by the arrow, where the energy consumption rate is low.

Figure 12:
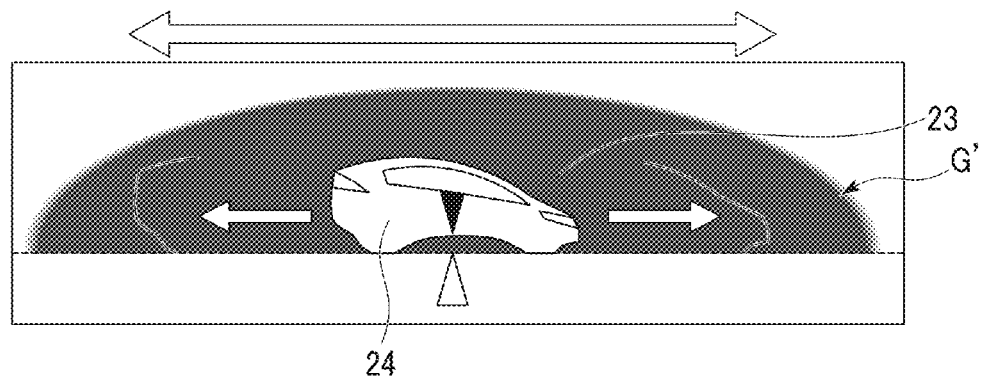
FIG. 12 is a diagram showing a display mode of the embodiment.

As shown in FIGS. 11 and 12, in an economic speed region, an icon 24 completely entering an eco region and the eco region significantly expanded on the acceleration side and the deceleration side of the icon 24 are displayed. Therefore, when performing travel at a constant speed or speed control with an appropriate acceleration/deceleration so as to maintain a state in which the icon 24 is present in the eco region displayed in a large range, it is possible to maintain a vehicle having an energy consumption rate state (driving state) represented by the point P in a range shown by the arrow in the eco region in which the energy consumption rate is low.

Figure 13:
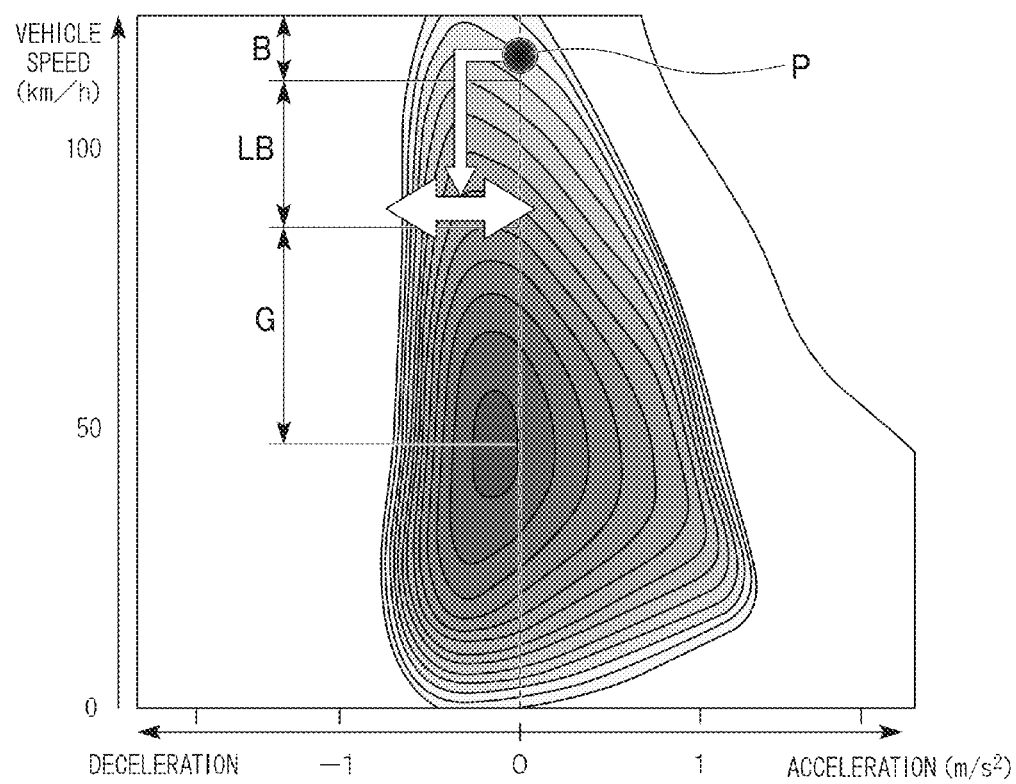
FIG. 13 is a diagram showing a range of the eco region in the energy consumption rate map of FIG. 2.
Figure 14:
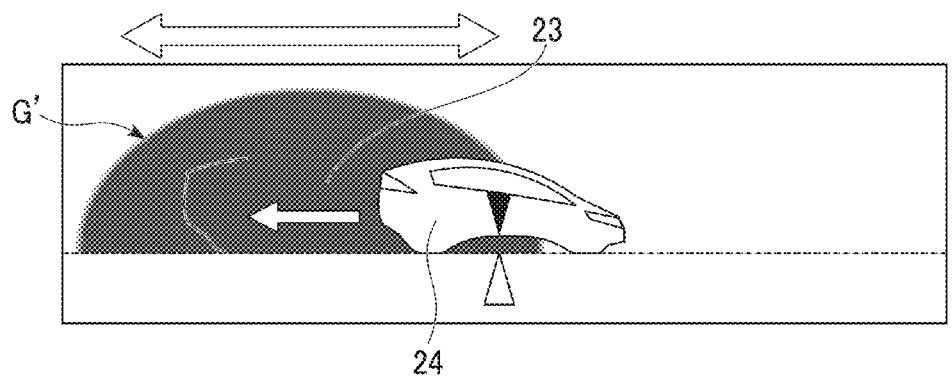
FIG. 14 is a diagram showing a display mode of the embodiment.

As shown in FIGS. 13 and 14, when the speed is too high, an icon 24 partially entering an eco region and the eco region positioned on the deceleration side of the icon 24 are displayed. Therefore, when decelerating a vehicle having an energy consumption rate state represented by the point P with an appropriate deceleration so as to match the icon 24 with the eco region positioned on the rear side, it is possible to reach a range on the rear side, shown by the arrow, where the energy consumption rate is low.

Figure 15:
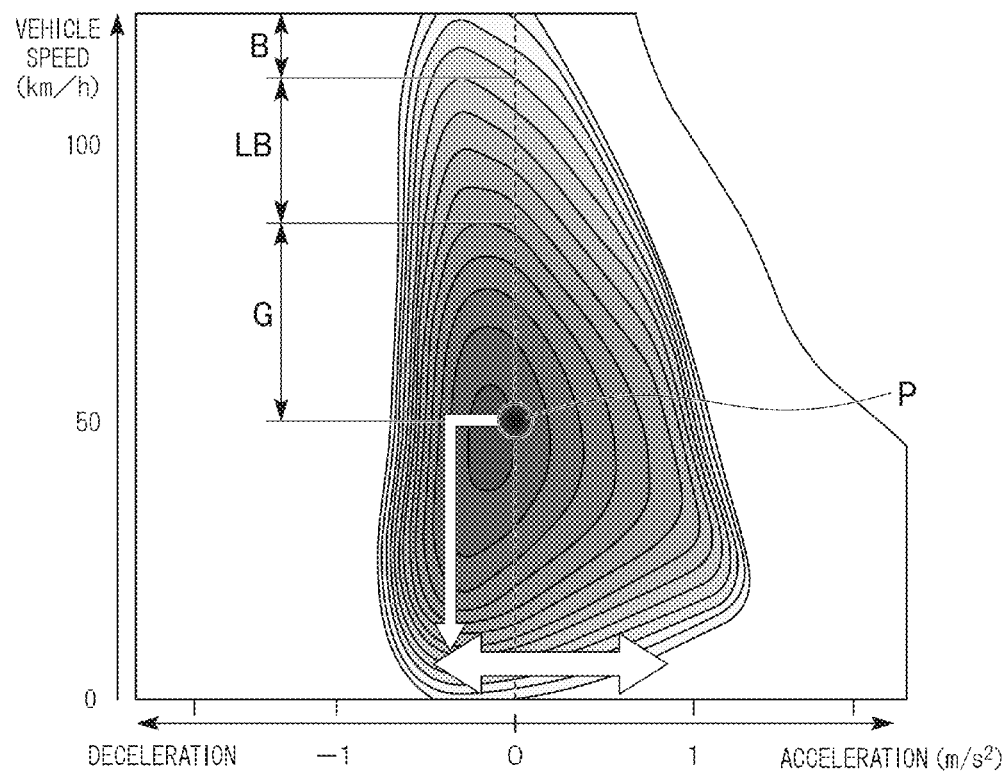
FIG. 15 is a diagram showing a range of the eco region in the energy consumption rate map of FIG. 2.
Figure 16:
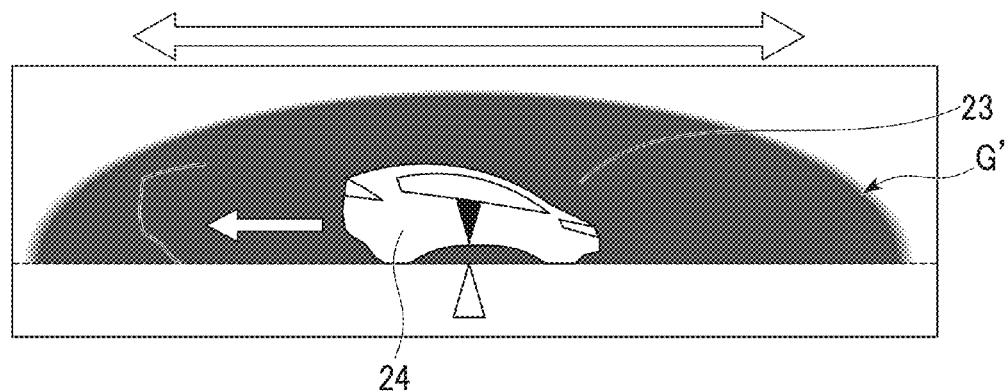
FIG. 16 is a diagram showing a display mode of the embodiment.

As shown in FIGS. 15 and 16, in deceleration from the economic speed region shown in FIGS. 11 and 12, when performing speed control with an appropriate deceleration so as to maintain a state in which the icon 24 is present in the eco region displayed in a large range, it is thus possible to maintain a vehicle having an energy consumption rate state represented by the point P in a range shown by the arrow in the eco region in which the energy consumption rate is low.

Figure 17:
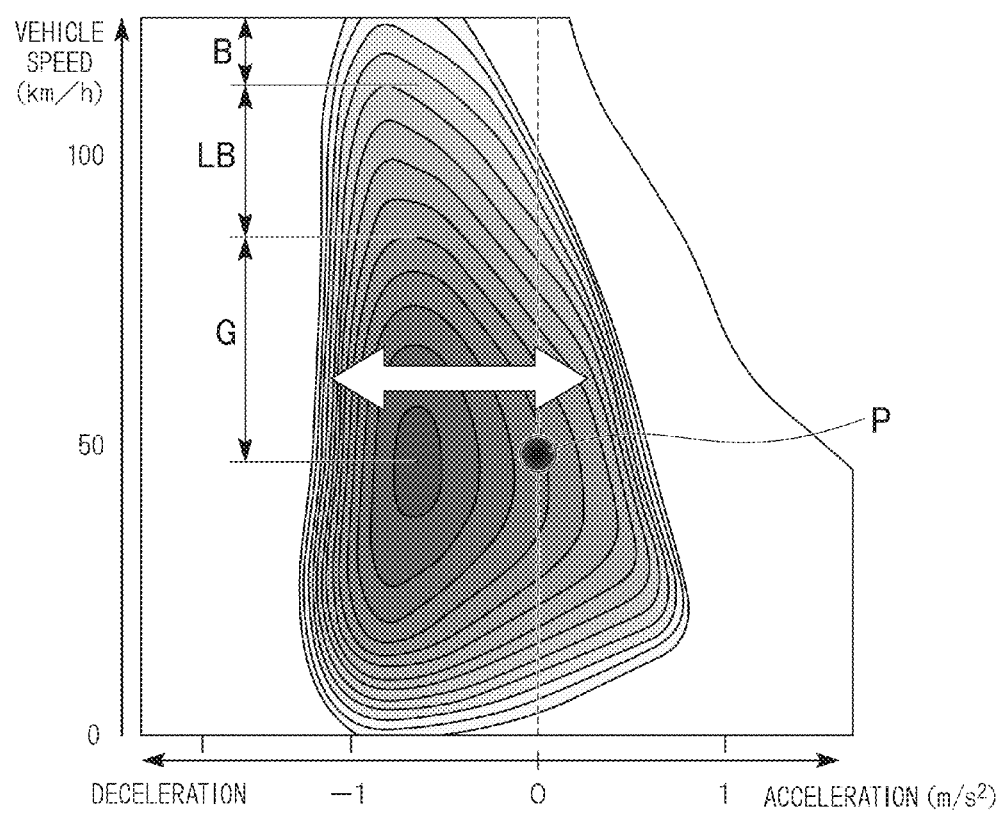
FIG. 17 is a diagram showing a range of the eco region in the energy consumption rate map of FIG. 2.
Figure 18:
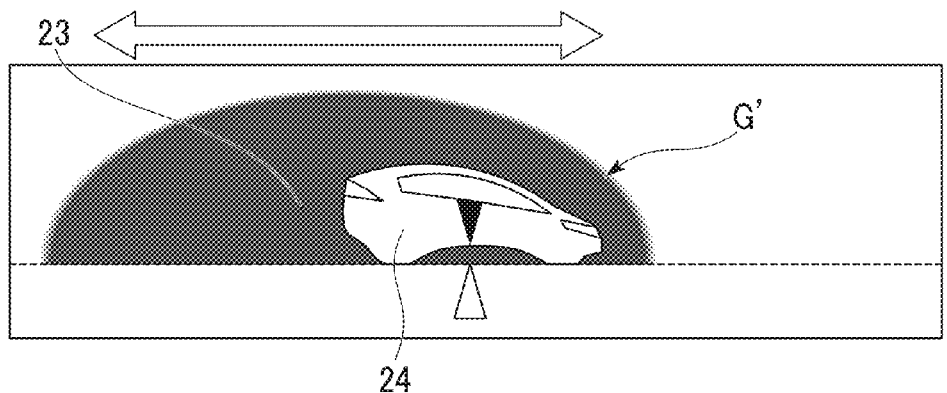
FIG. 18 is a diagram showing a display mode of the embodiment.
Figure 19:
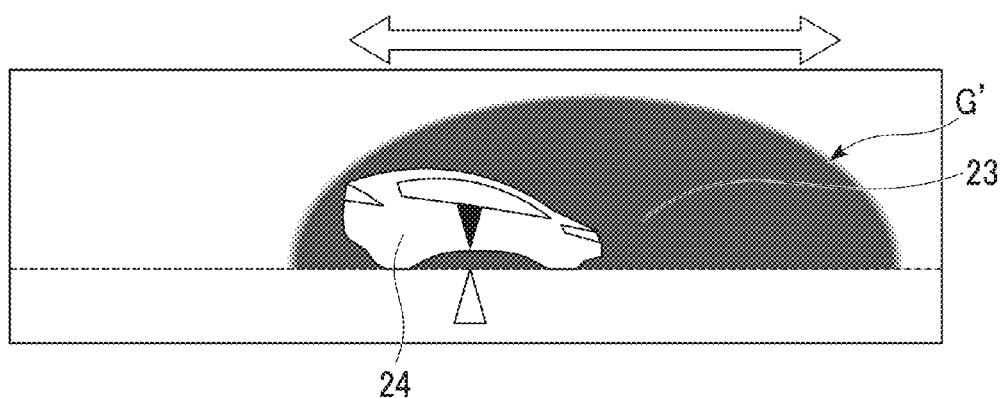
FIG. 19 is a diagram showing a display mode of the embodiment.

As shown in FIGS. 17 to 19, in the case of travel on a gradient, the one-dimensional energy consumption rate map 23 shifts to the left side during travel on an upward slope, and the one-dimensional energy consumption rate map 23 shifts to the right side during travel on a downward slope. Therefore, a vehicle having an energy consumption rate state (driving situation) represented by the point P is accelerated or decelerated in such an acceleration/deceleration range suited to the shift amount of the one-dimensional energy consumption rate map 23 as to maintain the icon 24 in the range shown by the arrow in the eco region. Regarding the shift amount of the one-dimensional energy consumption rate map 23, by grasping the tendency of the change in the energy consumption rate characteristics during travel on a gradient, the one-dimensional energy consumption rate map 23 is shifted based on the shift amount and displayed.

According to the second embodiment, in addition to the effect of the first embodiment, since the size or the position of the eco region changes in accordance with the speed of the vehicle, eco driving can be conducted by moving the icon 24 in accordance with the change. Here, by bringing the icon 24 closer to the triangle mark 21, it is possible to grasp the fact that the vehicle is being driven at a constant speed, and a further eco driving can be performed.

Since the icon 24 itself is formed into a non-line-symmetric shape to indicate the moving direction, it is not necessary for the display unit 1' to display other various display items.

Depending on the current speed or acceleration/deceleration of the vehicle, a position, which relates to the current speed in the energy consumption rate map of FIG. 2, where the one-dimensional energy consumption rate map 23 is cut out from the energy consumption rate map varies. Thus, the size or the position of the eco region, which indicates where the energy consumption rate is low, changes. Therefore, eco driving can be conducted by moving the icon 24 in accordance with a change of the size or the position of the eco region.

Since the eco region is displayed in a maximum size when driving is performed in an energy consumption rate state in which the icon 24 is positioned in the central part of the eco region, the moving range of the icon 24 increases and the degree of freedom of the driver's driving motion can be increased in accordance with this increase.

On the other hand, when a range in which the eco region and the icon 24 overlap each other is small, a smaller eco region is displayed. Therefore, this reduced eco region strongly prompts the driver to move the icon 24 into the eco region, and thereby it is able to assist conducting eco driving.

Furthermore, the one-dimensional energy consumption rate map 23 uses one axis composition of an acceleration/deceleration of the vehicle. Therefore, the operation of moving the icon 24 to the eco region can be simply performed by changing the acceleration/deceleration through accelerator and brake operation of the driver, and eco driving can thus be more simply realized.

Figure 20:
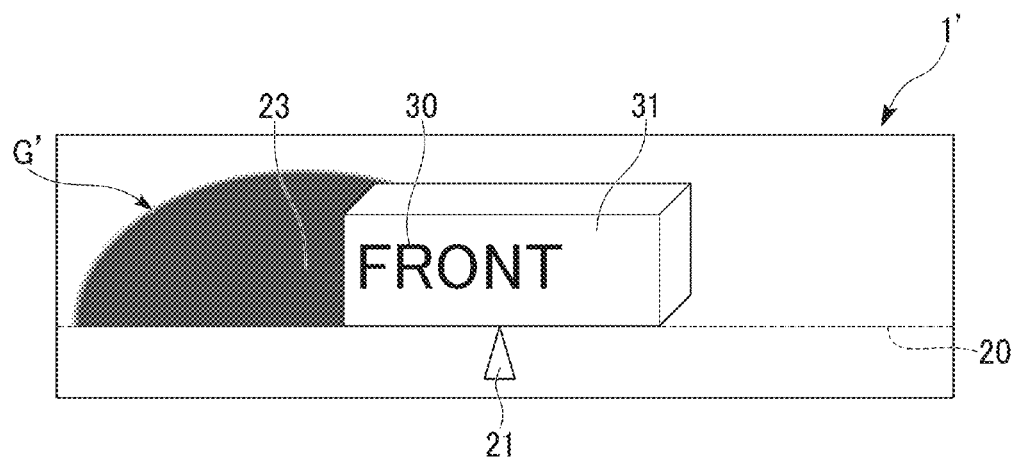
FIG. 20 is a diagram showing another display mode of the embodiment.
Figure 21:
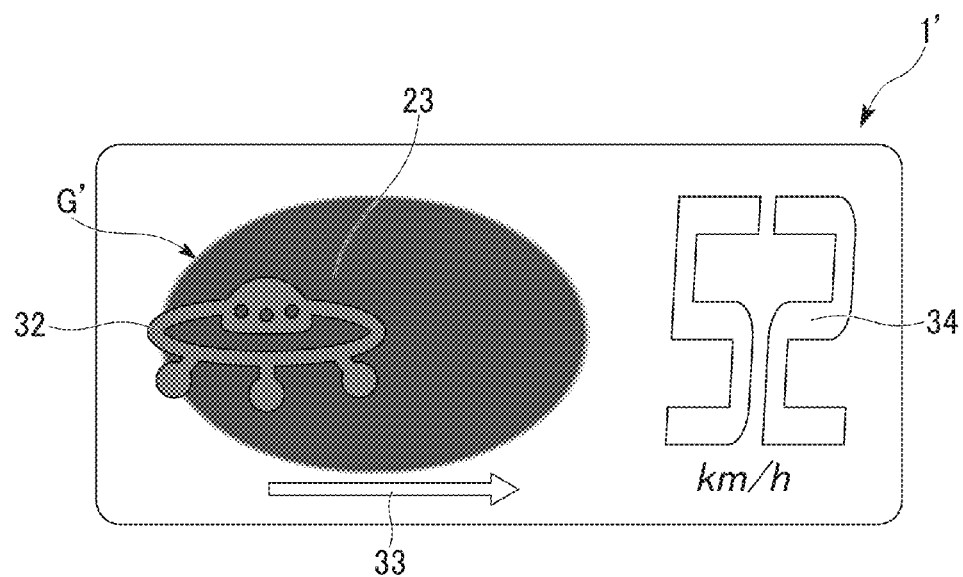
FIG. 21 is a diagram showing a further display mode of the embodiment.
Figure 22:
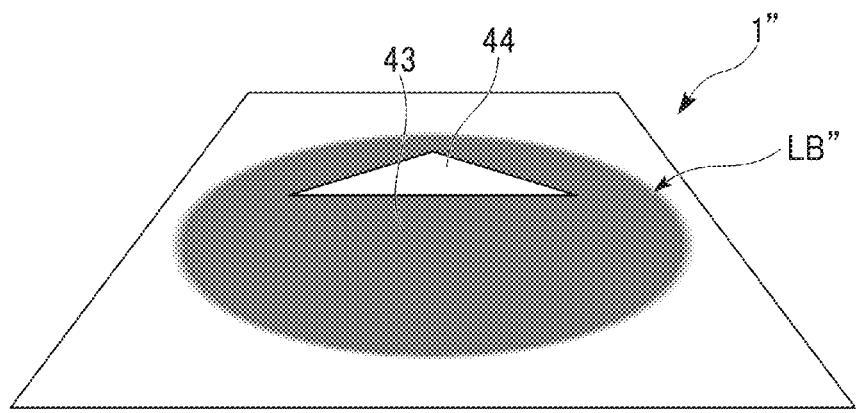
FIG. 22 is a diagram showing a display mode of a display unit of a third embodiment of the invention.

In the above-described second embodiment, the case has been exemplified in which the icon 24 with a non-line-symmetric shape which indicates a vehicle is used. However, as shown in FIG. 20, a block-shaped icon 31 having no directionality in which a word "front" 30 is provided at one end may be used. In addition, as shown in FIG. 21, the shape of an icon 32 itself may not regulate the direction, but an arrow symbol 33 indicating the direction may be displayed adjacent to the icon 32, and a speed display 34 may be displayed together to display the speed at which the map is cut out.

Next, a third embodiment of the invention will be described based on FIGS. 22 to 27. In this embodiment, a one-dimensional energy consumption rate map 43 with an elliptical shape is displayed in a display unit 1" with a trapezoidal shape, and a triangular icon 44 is displayed so that an apex thereof faces upward. In this embodiment, a triangular icon 44 facing upward indicates an acceleration state, and a triangular icon 44 facing downward indicates a deceleration state. The color of the one-dimensional energy consumption rate map 43 changes to green G" when a vehicle is driven in an eco region, changes to light blue LB" when there is a slight deviation of the icon from the eco region, and changes to blue B" when there is a further deviation of the icon from the eco region. In this embodiment, the eco region also includes the light blue region LB.

Figure 23:
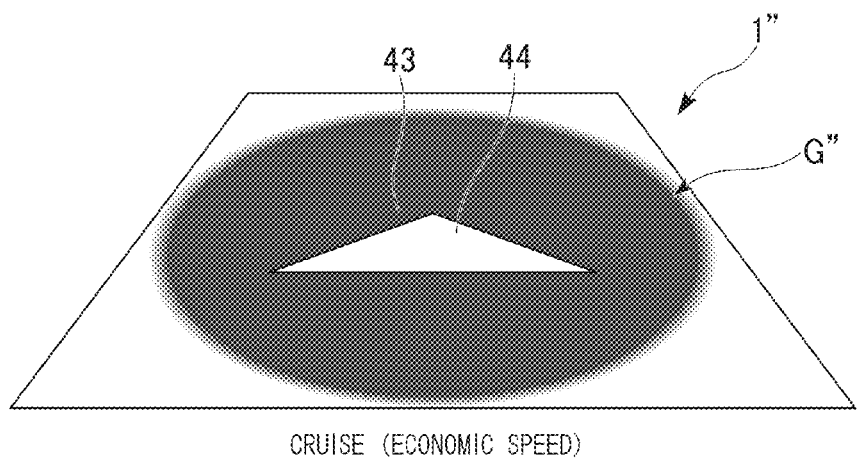
FIG. 23 is a diagram showing a display mode of the display unit of the embodiment.

As shown in FIG. 23, during driving in the eco region, the icon 44 is positioned in the central part, and the one-dimensional energy consumption rate map 43 is indicated by green G" representing the eco region. However, in a gentle-acceleration and high-speed cruise shown in FIG. 22, the icon 44 moves to an upper part of the one-dimensional energy consumption rate map 43, the size of the icon 44 becomes slightly smaller than in FIG. 23, and the color of the one-dimensional energy consumption rate map 43 changes to light blue LB". Although not shown in the drawing, in a sudden-acceleration and ultra-high-speed cruise, the icon 44 deviates to the upper side from the one-dimensional energy consumption rate map 43, the size of the icon 44 becomes slightly smaller than in FIG. 23, and the color of the one-dimensional energy consumption rate map 43 changes to blue B".

Figure 24:
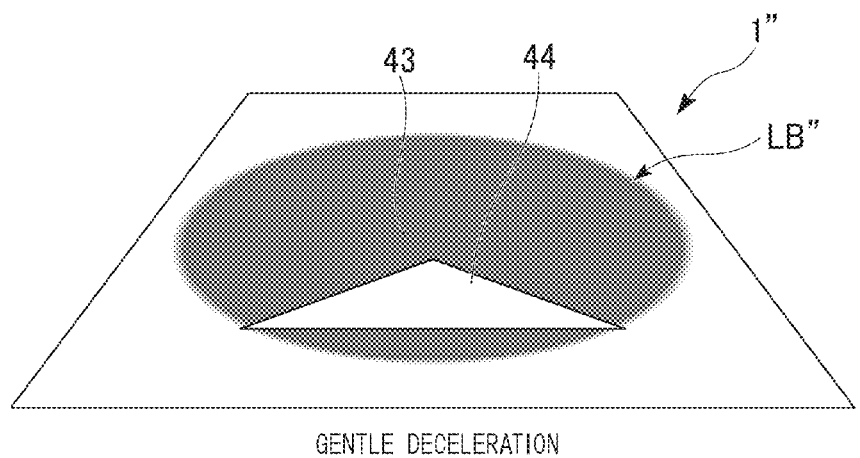
FIG. 24 is a diagram showing a display mode of the display unit of the embodiment.

As shown in FIG. 24, with a gentle deceleration, the icon 44 moves to a lower part of the one-dimensional energy consumption rate map 43, the size of the icon 44 becomes slightly larger than in FIG. 23, and the color of the one-dimensional energy consumption rate map 43 changes to light blue LB". Although not shown in the drawing, in a sudden-deceleration and ultra-low-speed cruise, the icon 44 deviates to the lower side from the one-dimensional energy consumption rate map 43, the size of the icon 44 becomes slightly larger than in FIG. 23, and the color of the one-dimensional energy consumption rate map 43 changes to blue B".

Figure 25:
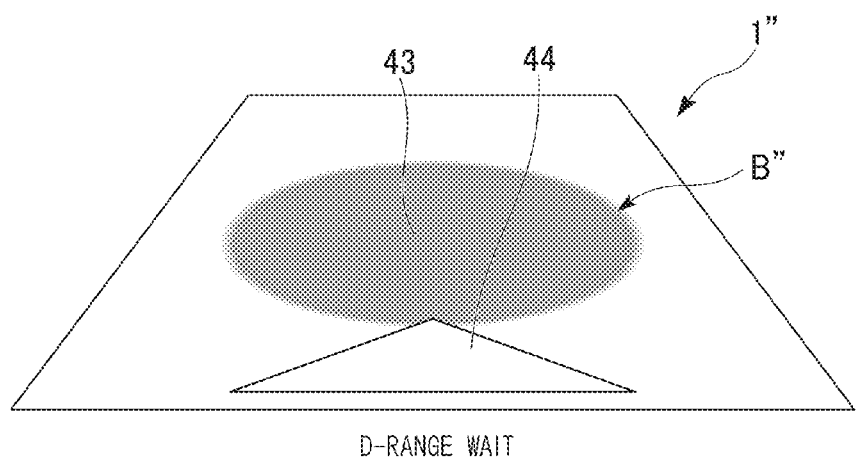
FIG. 25 is a diagram showing a display mode of the display unit of the embodiment.
Figure 26:
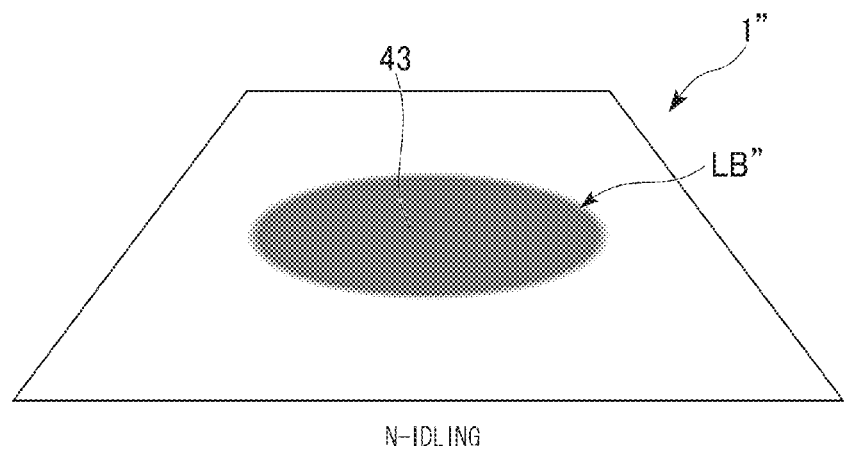
FIG. 26 is a diagram showing a display mode of the display unit of the embodiment.
Figure 27:
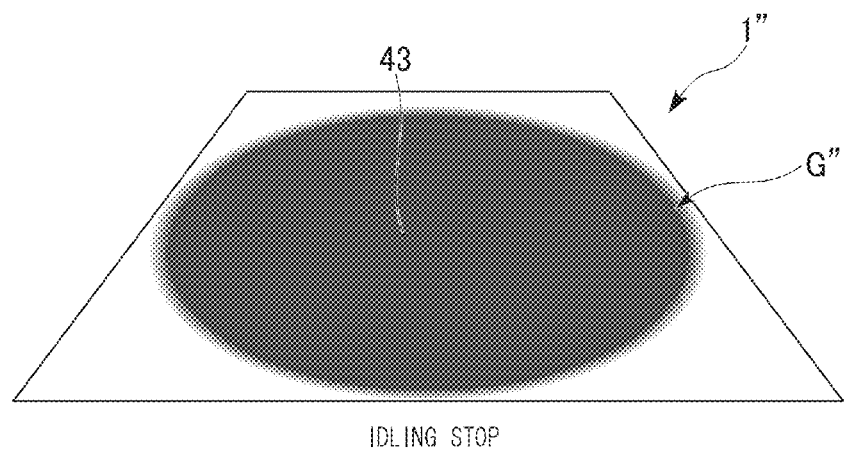
FIG. 27 is a diagram showing a display mode of the display unit of the embodiment.

In addition, in the case of a D-range (driving range) when the vehicle has stopped, as shown in FIG. 25, the icon 44 moves to the lower side from the one-dimensional energy consumption rate map 43, the size of the icon 44 becomes slightly larger than in FIG. 23, and the color of the one-dimensional energy consumption rate map 43 changes to blue B". Thus, the next operation for reducing the energy consumption rate can be promoted. In the case of idling at an N-position (neutral position) when the vehicle has stopped, as shown in FIG. 26, the icon is not displayed and the color of the one-dimensional energy consumption rate map 43 changes to light blue LB". In the case of an idling stop, as shown in FIG. 27, the color of the one-dimensional energy consumption rate map 43 of FIG. 26 changes to green G", and thus it is possible to inform the driver that the energy consumption rate is appropriate.

The invention is not limited to the above-described embodiments, and for example, a non-line-symmetric icon with an arrow shape or a vehicle shape which has a function of defining the moving direction can be used in place of the icon 44 of the third embodiment.

In addition, the one-dimensional energy consumption rate map 23 in the second embodiment is obtained by cutting out the energy consumption rate map shown in FIG. 2 at a current speed of the vehicle, but a map obtained by cutting out the energy consumption rate map shown in FIG. 2 at a current acceleration/deceleration of the vehicles may be used. In this case, the horizontal axis of the map represents the speed.

The case has been exemplified in which during travel on a gradient, the energy consumption rate map is shifted and displayed according to the gradient. However, the energy consumption rate map may be shifted according to the position of a shift lever of the vehicle or the loading capacity of the vehicle.

INDUSTRIAL APPLICABILITY

According to the invention, by displaying an icon indicating a current energy consumption rate (driving situation) of a vehicle on a map showing an energy consumption rate, and by changing the speed of the vehicle and the acceleration/deceleration of the vehicle in accordance with a direction defining display portion of a display unit, the icon on the map showing the energy consumption rate can be moved to a region in which the energy consumption rate is low. Thus, an occupant can rapidly grasp how the occupant should perform speed control to perform eco driving in which the energy consumption rate is low, and thus can easily and reliably perform the eco driving.

In addition, the eco driving can be conducted with a simple operation of moving the icon to the region in which the energy consumption rate is low. Furthermore, since the energy consumption rate is used, it is possible to reliably inform a driver of the region in which the energy consumption rate is low in accordance with the speed or acceleration/deceleration.

REFERENCE SIGNS LIST 1, 1', 1": DISPLAY UNIT
3: ENERGY CONSUMPTION RATE MAP
4: ICON
5: LINE (INDICATOR)
7: STREAMLINE FIGURE
8: WAVY LINE FIGURE
9: ACCELERATION VEHICLE FIGURE
10: REARWARD WAVY LINE FIGURE
11: DECELERATION VEHICLE FIGURE
12: DIRECTION DEFINING DISPLAY PORTION
21: TRIANGLE MARK (INDICATOR)
23: ONE-DIMENSIONAL ENERGY CONSUMPTION RATE MAP
24: ICON
43: ONE-DIMENSIONAL ENERGY CONSUMPTION RATE MAP
44: ICON

The invention claimed is:

1. A driving assistance device comprising:
a display unit which displays
an energy consumption rate map which shows a distribution of an energy consumption rate during travel of a vehicle,
an icon which indicates a current energy consumption rate of the vehicle on the energy consumption rate map, the current energy consumption rate being defined by a speed of the vehicle and an acceleration/deceleration of the vehicle, and
a direction defining display portion which defines a moving direction of the icon,
wherein the energy consumption rate map displays an eco region, which is a region in which the energy consumption rate is lower than a predetermined value, with a color different from those of the other regions of the energy consumption rate map in the display unit.

2. The driving assistance device according to claim 1, wherein the direction defining display portion comprises a symbol, a figure, or a word which is displayed adjacent to the icon and defines a front-back direction of the icon.

3. The driving assistance device according to claim 2, wherein the display unit comprises an indicator which corresponds to the energy consumption rate map and indicates that the acceleration of the vehicle is near zero.

4. The driving assistance device according to claim 2, wherein in the energy consumption rate map, the distribution of the energy consumption rate changes during travel of the vehicle on an upward slope or on a downward slope.

5. The driving assistance device according to claim 2, wherein the energy consumption rate map uses two axes composition representing a speed of the vehicle and an acceleration/deceleration of the vehicle.

6. The driving assistance device according to claim 1, wherein the display unit comprises an indicator which corresponds to the energy consumption rate map and indicates that the acceleration of the vehicle is near zero.

7. The driving assistance device according to claim 1, wherein in the energy consumption rate map, the distribution of the energy consumption rate changes during travel of the vehicle on an upward slope or on a downward slope.

8. The driving assistance device according to claim 1, wherein the energy consumption rate map uses two axes composition representing a speed of the vehicle and an acceleration/deceleration of the vehicle.

9. A driving assistance device comprising:
a display unit which displays
a one-dimensional energy consumption rate map which is obtained by cutting out, at a current speed or acceleration/deceleration of a vehicle, an energy consumption rate map which indicates a distribution of an energy consumption rate which is an energy consumption during travel of the vehicle, and
an icon which indicates a current energy consumption rate of the vehicle, which is defined by a speed of the vehicle and an acceleration/deceleration of the vehicle, on the one-dimensional energy consumption rate map,
wherein the icon is formed into a non-line-symmetric shape to indicate a moving direction of the vehicle, which is obtained based on a speed of the vehicle and an acceleration/deceleration of the vehicle, and
the one-dimensional energy consumption rate map displays an eco region, which is a region in which the energy consumption rate is lower than a predetermined value, with a color different from those of the other regions of the one-dimensional energy consumption rate map in the display unit.

10. The driving assistance device according to claim 9, wherein a size or a position of the eco region is determined in accordance with a speed of the vehicle or an acceleration/deceleration of the vehicle.

11. The driving assistance device according to claim 10, wherein the size of the eco region is maximized when the icon is positioned near a central part of the eco region.

12. The driving assistance device according to claim 10, wherein a smaller a range in which the eco region and the icon overlap each other, a smaller the eco region is displayed.

13. The driving assistance device according to claim 10, wherein the display unit includes an indicator which corresponds to the one-dimensional energy consumption rate map and indicates that the acceleration of the vehicle is near zero.

14. The driving assistance device according to claim 10, wherein in the one-dimensional energy consumption rate map, the distribution of the energy consumption rate changes during travel of the vehicle on an upward slope or on a downward slope.

15. The driving assistance device according to claim 10, wherein the one-dimensional energy consumption rate map uses one axis composition representing an acceleration/deceleration of the vehicle.

16. The driving assistance device according to claim 9, wherein the size of the eco region is maximized when the icon is positioned near a central part of the eco region.

17. The driving assistance device according to claim 9, wherein a smaller a range in which the eco region and the icon overlap each other, a smaller the eco region is displayed.

18. The driving assistance device according to claim 9, wherein the display unit includes an indicator which corresponds to the one-dimensional energy consumption rate map and indicates that the acceleration of the vehicle is near zero.

19. The driving assistance device according to claim 9, wherein in the one-dimensional energy consumption rate map, the distribution of the energy consumption rate changes during travel of the vehicle on an upward slope or on a downward slope.

20. The driving assistance device according to claim 9, wherein the one-dimensional energy consumption rate map uses one axis composition representing an acceleration/deceleration of the vehicle.

\* \* \* \* \*